US011757829B2

(12) United States Patent
Yang et al.

(10) Patent No.: US 11,757,829 B2
(45) Date of Patent: Sep. 12, 2023

(54) METHOD AND DEVICE FOR DETECTING IPV6 ALIASED PREFIX BASED ON FRAGMENTED FINGERPRINT

(71) Applicant: Tsinghua University, Beijing (CN)

(72) Inventors: Jiahai Yang, Beijing (CN); Guanglei Song, Beijing (CN); Lin He, Beijing (CN); Long Pan, Beijing (CN); Zhiliang Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/587,929

(22) Filed: Jan. 28, 2022

(65) Prior Publication Data

US 2022/0166749 A1     May 26, 2022

Related U.S. Application Data

(63) Continuation of application No. PCT/CN2021/131234, filed on Nov. 17, 2021.

(30) Foreign Application Priority Data

Nov. 20, 2020    (CN) .......................... 202011311488.1
Nov. 23, 2020    (CN) .......................... 202011322303.7

(51) Int. Cl.
    *G06F 15/16*        (2006.01)
    *H04L 61/5007*    (2022.01)
    (Continued)

(52) U.S. Cl.
    CPC .... *H04L 61/5007* (2022.05); *H04L 2101/659* (2022.05); *H04L 2101/668* (2022.05)

(58) Field of Classification Search
    CPC .......... H04L 61/5007; H04L 2101/659; H04L 2101/668; H04L 61/5092
    (Continued)

(56) References Cited

U.S. PATENT DOCUMENTS 10,834,265 B1 * 11/2020 Antunes .............. H04M 3/2236
2009/0296685 A1 * 12/2009 O'Shea ................... H04L 69/32
                                                                                370/351

(Continued)

FOREIGN PATENT DOCUMENTS

CN           112492062 A      3/2021

OTHER PUBLICATIONS

Beverly et al., "IPv6 Alias Resolution via Induced Fragmentation," Passive and Active Measurement, Lecture Notes in Computer Science, 2013, vol. 7799.

(Continued)

*Primary Examiner* — Karen C Tang
(74) *Attorney, Agent, or Firm* — Hodgson Russ LLP

(57) ABSTRACT

A method for detecting an IPv6 aliased prefix based on fragmented fingerprint includes: generating a plurality of pseudo random addresses in a target prefix space; determining the target prefix as an active prefix; and determining that the plurality of the pseudo random addresses and the active prefix are configured on the same host, so as to identify the active prefix as the aliased prefix. This method may effectively discover a network host, reduce the cost of network detection, and provide more effective data support for network measurement, network surveying and mapping and security research.

12 Claims, 1 Drawing Sheet

(51) Int. Cl.
  *G06F 15/173*    (2006.01)
  *H04L 101/659*   (2022.01)
  *H04L 101/668*   (2022.01)

(58) Field of Classification Search
  USPC ........................................................ 709/224
  See application file for complete search history.

(56) References Cited

U.S. PATENT DOCUMENTS

2014/0003424 A1* 1/2014 Matsuhira ............... H04L 47/36
                                                       370/389
2020/0084300 A1* 3/2020 Dutta ..................... H04L 69/22

OTHER PUBLICATIONS

Gasser et al., "Clusters in the Expanse: Understanding and Unbiasing 1Pv6 Hitlists," Proceedings of the 2018 Internet Measurement Conference (IMC '18), 2018.
Wang et al., "Research on the IP alias reslution technology," Journal on Communications, Jul. 2019, vol. 40, No. 7.
WIPO, International Search Report and Written Opinion for PCT/CN2021/131234, dated Jan. 28, 2022.

* cited by examiner

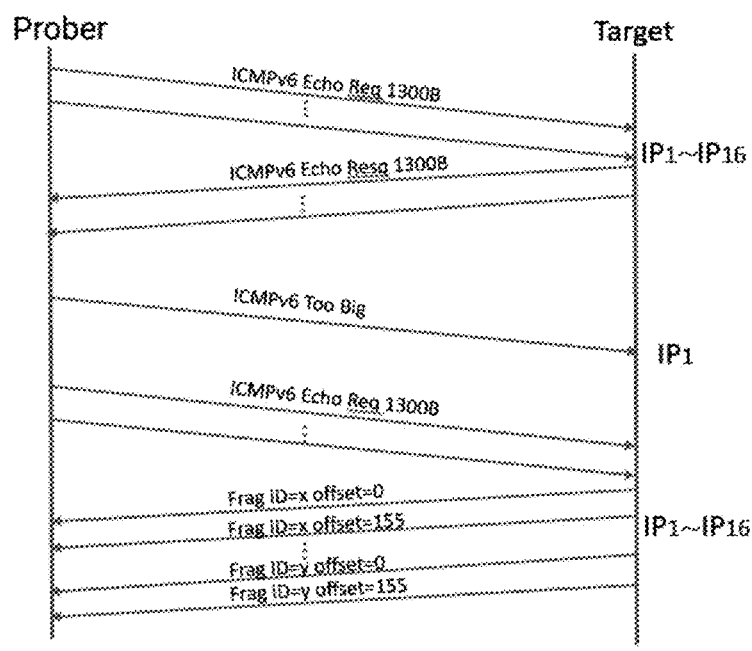

METHOD AND DEVICE FOR DETECTING IPV6 ALIASED PREFIX BASED ON FRAGMENTED FINGERPRINT

CROSS-REFERENCE TO RELATED APPLICATIONS

This application is a continuation application of International Application No. PCT/CN2021/131234, filed Nov. 17, 2021, which claims priority to and benefits of Chinese Patent Application No. 202011311488.1 filed on Nov. 20, 2020 and Chinese Patent Application No. 202011322303.7 filed on Nov. 23, 2020, the entire contents of which are incorporated herein by reference.

FIELD

The present disclosure relates to an IPv6 aliased prefix detection technology, and more particularly to a method and device for detecting an IPv6 aliased prefix based on fragmented fingerprint and a non-transitory computer-readable storage medium.

BACKGROUND

Aliased prefix detection is based on the following experience: under non-aliased prefixes, the event that all randomly generated IPv6 (Internet Protocol Version 6) addresses are active is a low probability event. The usual practice of the aliased prefix detection is to select an address prefix of a specific length, and then generate a certain number of IPv6 addresses under the prefix for detection, and perform alias judgment according to the number of active addresses. In Murdock et al, 3 addresses are randomly generated in 96 prefix space, and three detection packets are sent to each address. If responses from the 3 random addresses are received, the prefix is determined as an aliased prefix. This method can only detect prefixes with a length of 96, which has great space limitations. At the same time, the randomly generated addresses may be distributed in the same subnet, resulting in misjudgment of the entire aliased prefix, i.e., a subnet prefix that is not an aliased prefix is misjudged as the aliased prefix. Gasser et al. proposed a multi-level aliased prefix detection algorithm, in which the prefix length is extended to the range of 64 to 124, and IPv6 addresses are pseudo-randomly generated in the prefix space. This method avoids misjudgment caused by subnet aliased prefix and verifies the validity of the alias based on fingerprints. However, the proposed fingerprint technique is a fuzzy and challenging technique, which cannot effectively characterize the aliased prefix, but is only an indirect verification of the detection result. At the same time, with the advancement of IPv6 address deployment, each address in a smaller prefix space (such as/124) is assigned to a different host, resulting in the failure of probability-based aliased prefix detection. Liu et al. proposed a large-scale aliased prefix detection technology embedded in dynamic scanning to avoid unnecessary scanning of the detected alias area and improve the discovery efficiency. This method also has the defects of multi-level aliased prefix detection algorithm. Probability-based aliased prefix detection can accurately detect whether all addresses within the prefix are active, but cannot prove that the aliased prefix is configured on the same host.

SUMMARY

Embodiments of the present disclosure seek to solve at least one of the problems existing in the related art to at least some extent.

For this, an object of the present disclosure is to provide a method and device for detecting an IPv6 aliased prefix based on fragmented fingerprint, which is able to effectively discover a network host, reduce the cost of network detection, and provide more effective data support for network measurement, network surveying and mapping and security research.

According to a first aspect of embodiments of the present disclosure, there is provided a method for detecting an IPv6 aliased prefix based on fragmented fingerprint. The method includes:

generating a plurality of pseudo random addresses in a target prefix space;

sending an ICMPv6 (Internet Control Message Protocol version 6) echo request packet with a size of X bits by a prober to each of the plurality of the pseudo random addresses, where X is a value in (1280, 1500];

determining the target prefix as an active prefix when the prober receives all ICMPv6 echo response packets;

sending an ICMP Too Big packet with an MTU (maximum transmission unit) of Y bits by the prober to one of the plurality of the pseudo random addresses to modify a PMTU (path maximum transmission unit) from a target host to the prober as Z, when all ICMPv6 echo response packets received are not fragmented, where Y is a value in [1280, X], and Z is equal to Y;

sending an ICMPv6 echo request packet with a size of W bits by the prober to each of the plurality of the pseudo random addresses, where W is equal to X; and determining that the plurality of the pseudo random addresses and the active prefix are configured on the same host, and identifying the active prefix as the aliased prefix, when a packet responded by each of the plurality of the pseudo random addresses of the target host is fragmented.

The method for detecting an IPv6 aliased prefix based on fragmented fingerprint according to embodiments of the present disclosure has the following advantages.

(1) The network host can be effectively discovered. The aliased prefix detection based on the fragmented fingerprint solves the problem of misjudgment of probability-based aliased prefix detection when the prefix space is small, effectively distinguishes the aliased prefix from the active prefix, effectively identifies the aliased prefix, and solves the mapping relationship between the host and the aliased prefix, and provides technical support for IPv6 resource detection to discovery effective host resources.

(2) The cost of network detection is reduced. In IPv6 measurement, from the perspective of a detector, the object to be researched is the host. If the host is configured with an aliased prefix, there are a large number of active addresses in local network space due to the existence of aliased prefix. During network resource detection, the aliased prefix will cause repeated measurement of a single destination host in network measurement, resulting in a large amount of unnecessary flow and wasting network resources. Removal of aliased addresses in the aliased prefix detection technology avoids massive sending of packets in the aliased prefix.

(3) More effective data support is provided for network measurement, network surveying and mapping and security research. The subject of network measurement, network surveying and mapping and security research is network devices. The existence of the IPv6 aliased prefix results in that the relationship between IPv6 addresses and host devices is no longer a one-to-one correspondence. The aliased prefix detection based on fragmented fingerprint solves the mapping relationship between hosts and addresses, and provides more effective IPv6 data support for subsequent research.

According to an embodiment of the present disclosure, generating the plurality of the pseudo random addresses in the target prefix space includes: dividing the target prefix space into a plurality of subnet spaces; and generating the pseudo random address in each of the plurality of the subnet spaces.

According to an embodiment of the present disclosure, each of the plurality of the subnet spaces is a 2N-bit subnet space, where N is an integer equal to or greater than 1.

According to an embodiment of the present disclosure, X is 1300, Y is 1280, Z is 1280, and W is 1300.

According to a second aspect of embodiments of the present disclosure, there is provided a device for detecting an IPv6 aliased prefix based on fragmented fingerprint. The device includes: a processor; and a memory for storing instructions executable by the processor. The processor is configured to:

generate a plurality of pseudo random addresses in a target prefix space;
send an ICMPv6 echo request packet with a size of X bits by a prober to each of the plurality of the pseudo random addresses, where X is a value in (1280, 1500];
determine the target prefix as an active prefix when the prober receives all ICMPv6 echo response packets;
send an ICMP Too Big packet with an MTU of Y bits by the prober to one of the plurality of the pseudo random addresses to modify a PMTU from a target host to the prober as Z, when all ICMPv6 echo response packets received are not fragmented, where Y is a value in [1280, X), and Z is equal to Y;
send an ICMPv6 echo request packet with a size of W bits by the prober to each of the plurality of the pseudo random addresses, where W is equal to X; and
determine that the plurality of the pseudo random addresses and the active prefix are configured on the same host, and identify the active prefix as the aliased prefix, when a packet responded by each of the plurality of the pseudo random addresses of the target host is fragmented.

According to an embodiment of the present disclosure, the processor is further configured to:

divide the target prefix space into a plurality of subnet spaces; and
generate the pseudo random address in each of the plurality of the subnet spaces.

According to a third aspect of embodiments of the present disclosure, there is provided a non-transitory computer-readable storage medium having therein instructions that, when executed by a processor, cause the method described above to be performed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a schematic timing diagram showing a method for detecting an IPv6 aliased prefix based on fragmented fingerprint according to embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements or the elements having same or similar functions unless otherwise represented. The embodiments described herein with reference to drawings are explanatory, illustrative, and used to generally understand the present disclosure. The embodiments shall not be construed to limit the present disclosure.

A method for detecting an IPv6 aliased prefix based on fragmented fingerprint according to embodiments of the present disclosure will be described below with reference to FIG. 1.

As illustrated in FIG. 1, the method for detecting an IPv6 aliased prefix based on fragmented fingerprint according to embodiments of the present disclosure includes the following steps.

Step 1: generation of a set of pseudo random addresses.

Specifically, a plurality of pseudo random addresses are generated in a target prefix space, and the plurality of the pseudo random addresses are all used as detection addresses. For example, as illustrated in FIG. 1, 16 pseudo random addresses may be generated in the target prefix space, which are named as IP1 to IP16, respectively.

Step 2: judgment of active prefix.

Specifically, a prober sends an ICMPv6 echo request packet with a size of X bits to each of the plurality of the pseudo random addresses, where X is a value in (1280, 1500]. For example, as illustrated in FIG. 1, the prober sends an ICMPv6 echo request packet with a size of 1300 bits to each of the plurality of the pseudo random addresses. When the prober receives all ICMPv6 echo response packets, the target prefix is determined as an active prefix.

Step 3: Determination of the consistency between the active prefix and a target host.

In the determination stage of the active prefix, when all the received ICMPv6 echo response packets are not fragmented, the prober sends an ICMP Too Big packet with an MTU of Y bits to one of the plurality of the pseudo random addresses, where Y is a value in [1280, X), for example, Y may be 1280. A PMTU of the target host is modified to be Z, where Z is equal to Y, for example, Z is 1280. Afterwards, the prober sends again an ICMPv6 echo request packet with a size of W bits to each of the plurality of the pseudo random addresses, where W is equal to X. For example, as illustrated in FIG. 1, the prober sends again an ICMPv6 echo request packet with a size of 1300 bits to each of the plurality of the pseudo random addresses. When a packet responded by each of the plurality of the pseudo random addresses of the target host is fragmented, it is determined that the plurality of the pseudo random addresses and the active prefix are configured on the same host, thereby identifying the active prefix as an aliased prefix.

It is understandable that when all the received ICMPv6 echo response packets are not fragmented, the prober sends an ICMP Too Big packet with an MTU of 1280 bits to one of the plurality of the pseudo random addresses, such as to IP1, to trick the target host to fragment. Correspondingly, in a short period of time, other pseudo-random addresses (such as IP2~IP16) of the plurality of the pseudo random addresses will also fragment when receiving packets. The PMTU of the target host is modified to 1280 (the minimum MTU value of IPv6 is 1280 bytes) to change characteristics of the target host. The prober resends the ICMPv6 echo request packets with a size of 1300 bits to the plurality of the pseudo random addresses, and these packets arrive at the target host without fragmentation. However, the PMTU from a cache of an IPv6 stack of the target host to the prober is 1280, if the target prefix is configured on the same host, a Ping request (i.e. the ICMPv6 echo request packet with the size of 1300 bits) sent by the prober to each pseudo random address causes the target host to respond with fragmented data packet. Therefore, by sending a trick packet to any one (such as IP1) of the plurality of the pseudo random addresses, the PMTU in the host cache is modified, and the modified result is still valid for IP2-IP16, then IP1 to IP16 are assigned to the same host, and the active prefix is configured on the same host, thereby identifying the active prefix as the aliased prefix.

It should be noted that X is a value in (1280, 1500], Y is a value in [1280, X), Z is equal to Y, and W is equal to X, so as to save flow and avoid wasting network resources.

The method for detecting an IPv6 aliased prefix based on fragmented fingerprint according to embodiments of present disclosure has the following advantages.

(1) The network host can be effectively discovered. The aliased prefix detection based on the fragmented fingerprint solves the problem of misjudgment of probability-based aliased prefix detection when the prefix space is small, effectively distinguishes the aliased prefix from the active prefix, effectively identifies the aliased prefix, and solves the mapping relationship between the host and the aliased prefix, and provides technical support for IPv6 resource detection to discovery effective host resources.

(2) The cost of network detection is reduced. In IPv6 measurement, from the perspective of a detector, the object to be researched is the host. If the host is configured with an aliased prefix, there are a large number of active addresses in local network space due to the existence of aliased prefix. During network resource detection, the aliased prefix will cause repeated measurement of a single destination host in network measurement, resulting in a large amount of unnecessary flow and wasting network resources. Removal of aliased addresses in aliased prefix detection technology avoids massive sending of packets in the aliased prefix.

(3) More effective data support is provided for network measurement, network surveying and mapping and security research. The subject of network measurement, network surveying and mapping and security research is network devices. The existence of the IPv6 aliased prefix results in that the relationship between IPv6 addresses and host devices is no longer a one-to-one correspondence. The aliased prefix detection based on fragmented ID solves the mapping relationship between hosts and addresses, and provides more effective IPv6 data support for subsequent research.

According to an embodiment of the present disclosure, generating the plurality of the pseudo random addresses in the target prefix space includes: dividing the target prefix space into a plurality of subnet spaces; and generating the pseudo random address in each of the plurality of the subnet spaces. In this way, for a given prefix, it can be effectively prevented that the randomly generated detection addresses (i.e., pseudo random addresses) are gathered in a subnet space, and an active subnet prefix causes the entire prefix to be determined as an active prefix.

According to an embodiment of the present disclosure, each of the plurality of the subnet spaces is a 2N-bit subnet space, where N is an integer equal to or greater than 1.

It can be understood that the division of the size of the subnet spaces is related to the number of the pseudo-random addresses to be generated, and the target prefix space can be divided into subnet spaces with different number of bits according to the required number of pseudo-random addresses.

According to an embodiment of the present disclosure, X is 1300, Y is 1280, Z is 1280, and W is 1300, so as to save flow and avoid wasting network resources.

According to embodiments of the present disclosure, there is provided a device for detecting an IPv6 aliased prefix based on fragmented fingerprint. The device includes: a processor; and a memory for storing instructions executable by the processor. The processor is configured to:
 generate a plurality of pseudo random addresses in a target prefix space;
 send an ICMPv6 echo request packet with a size of X bits by a prober to each of the plurality of the pseudo random addresses, where X is a value in (1280, 1500];
 determine the target prefix as an active prefix when the prober receives all ICMPv6 echo response packets;
 send an ICMP Too Big packet with an MTU of Y bits by the prober to one of the plurality of the pseudo random addresses to modify a PMTU from a target host to the prober as Z, when all ICMPv6 echo response packets received are not fragmented, where Y is a value in [1280, X), and Z is equal to Y;
 send an ICMPv6 echo request packet with a size of W bits by the prober to each of the plurality of the pseudo random addresses, where W is equal to X; and
 determine that the plurality of the pseudo random addresses and the active prefix are configured on the same host, and identify the active prefix as the aliased prefix, when a packet responded by each of the plurality of the pseudo random addresses of the target host is fragmented.

According to an embodiment of the present disclosure, the processor is further configured to: divide the target prefix space into a plurality of subnet spaces; and generate the pseudo random address in each of the plurality of the subnet spaces.

According to an embodiment of the present disclosure, each of the plurality of the subnet spaces is a 2N-bit subnet space, where N is an integer equal to or greater than 1.

According to an embodiment of the present disclosure, X is 1300, Y is 1280, Z is 1280, and W is 1300.

According to an embodiment of the present disclosure, there is provided a non-transitory computer-readable storage medium having stored therein instructions that, when executed by a processor, cause the method described above to be performed.

The above non-transitory computer-readable storage medium including the computer executable instruction may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media includes (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by an instruction executed system, apparatus or device, or a connection thereof.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, variants and modifications can be made in the embodiments without departing from spirit, principles and scope of the present disclosure.

What is claimed is:

1. A method for detecting an internet protocol version 6 (IPv6) aliased prefix based on fragmented fingerprint, comprising:
    generating a plurality of pseudo random addresses in a target prefix space;
    sending an internet control message protocol version 6 (ICMPv6) echo request packet with a size of X bits by a prober to each of the plurality of pseudo random addresses, where X is a value greater than 1280 but less than or equal to 1500;
    determining the target prefix as an active prefix when the prober receives all ICMPv6 echo response packets;
    sending an internet control message protocol (ICMP) Too Big packet with a maximum transmission unit (MTU) of Y bits by the prober to one of the plurality of pseudo random addresses to modify a path maximum transmission unit (PMTU) from a target host to the prober as Z, when all ICMPv6 echo response packets received are not fragmented, where Y is a value greater than or equal to 1280 but less than X, and Z is equal to Y;
    sending an ICMPv6 echo request packet with a size of W bits by the prober to each of the plurality of pseudo random addresses, where W is equal to X; and
    determining that the plurality of pseudo random addresses and the active prefix are configured on a same host, and identifying the active prefix as the aliased prefix, when a packet responded by each of the plurality of pseudo random addresses of the target host is fragmented.

2. The method according to claim 1, wherein generating the plurality of pseudo random addresses in the target prefix space comprises:
    dividing the target prefix space into a plurality of subnet spaces; and
    generating pseudo random addresses in each of the plurality of the subnet spaces.

3. The method according to claim 2, wherein each of the plurality of subnet spaces is a 2N-bit subnet space, where N is an integer equal to or greater than 1.

4. The method according to claim 1, wherein X is 1300, Y is 1280, Z is 1280, and W is 1300.

5. A device for detecting an internet protocol version 6 (IPv6) aliased prefix based on fragmented fingerprint, comprising:
    a processor; and
    a memory for storing instructions executable by the processor;
    wherein the processor is configured to:
        generate a plurality of pseudo random addresses in a target prefix space;
        send an internet control message protocol version 6 (ICMPv6) echo request packet with a size of X bits by a prober to each of the plurality of pseudo random addresses, where X is a value greater than 1280 but less than or equal to 1500;
        determine the target prefix as an active prefix when the prober receives all ICMPv6 echo response packets;
        send an internet control message protocol (ICMP) Too Big packet with a maximum transmission unit (MTU) of Y bits by the prober to one of the plurality of pseudo random addresses to modify a path maximum transmission unit (PMTU) from a target host to the prober as Z, when all ICMPv6 echo response packets received are not fragmented, where Y is a value greater than or equal to 1280 but less than X, and Z is equal to Y;
        send an ICMPv6 echo request packet with a size of W bits by the prober to each of the plurality of pseudo random addresses, where W is equal to X; and
        determine that the plurality of pseudo random addresses and the active prefix are configured on a same host, and identify the active prefix as the aliased prefix, when a packet responded by each of the plurality of pseudo random addresses of the target host is fragmented.

6. The device according to claim 5, wherein the processor is further configured to:
    divide the target prefix space into a plurality of subnet spaces; and
    generate pseudo random addresses in each of the plurality of subnet spaces.

7. The device according to claim 6, wherein each of the plurality of subnet spaces is a 2N-bit subnet space, where N is an integer equal to or greater than 1.

8. The device according to claim 7, wherein X is 1300, Y is 1280, Z is 1280, and W is 1300.

9. A non-transitory computer-readable storage medium having stored therein instructions that, when executed by a processor, cause a method for detecting an internet protocol version 6 (IPv6) aliased prefix based on fragmented fingerprint to be performed, the method comprising:
    generating a plurality of pseudo random addresses in a target prefix space;
    sending an internet control message protocol version 6 (ICMPv6) echo request packet with a size of X bits by a prober to each of the plurality of pseudo random addresses, where X is a value greater than 1280 but less than or equal to 1500;

determining the target prefix as an active prefix when the prober receives all ICMPv6 echo response packets;

sending an internet control message protocol (ICMP) Too Big packet with a maximum transmission unit (MTU) of Y bits by the prober to one of the plurality of pseudo random addresses to modify a path maximum transmission unit (PMTU) from a target host to the prober as Z, when all ICMPv6 echo response packets received are not fragmented, where Y is a value greater than or equal to 1280 but less than X, and Z is equal to Y;

sending an ICMPv6 echo request packet with a size of W bits by the prober to each of the plurality of pseudo random addresses, where W is equal to X; and determining that the plurality of pseudo random addresses and the active prefix are configured on a same host, and identifying the active prefix as the aliased prefix, when a packet responded by each of the plurality of pseudo random addresses of the target host is fragmented.

10. The non-transitory computer-readable storage medium according to claim 9, wherein generating the plurality of pseudo random addresses in the target prefix space comprises:

dividing the target prefix space into a plurality of subnet spaces; and generating pseudo random addresses in each of the plurality of the subnet spaces.

11. The non-transitory computer-readable storage medium according to claim 10, wherein each of the plurality of subnet spaces is a 2N-bit subnet space, where N is an integer equal to or greater than 1.

12. The non-transitory computer-readable storage medium according to claim 9, wherein X is 1300, Y is 1280, Z is 1280, and W is 1300.

* * * * *